Patented May 19, 1953

2,639,236

UNITED STATES PATENT OFFICE 2,639,236

METHOD OF PRODUCING A COFFEE SUBSTITUTE

James H. Zachary, Arlington, Calif.

No Drawing. Application October 18, 1950, Serial No. 190,869

4 Claims. (Cl. 99—74)

This invention relates to an edible concentrate obtained from vegetation and a method of producing the same, and in particular a finely ground powder obtained by dehydrating a syrup extratced from alfalfa or other forage plants and prepared for use as a coffee substitute.

The purpose of this invention is to provide a process of producing a coffee substitute from a fibrous plant in which the useless fibers are eliminated and only the food containing ingredients utilized.

In many types of vegetation the fibrous character of the forage plants makes it difficult for even an animal to obtain maximum food value from the plants. In vegetation, such as alfalfa, parsley, watercress, clovers, grasses, young cereal grains and the like, considerable energy is required to remove the beneficial food elements carried by the fibers. While a certain amount of fibrous material is often desirable to act as roughage, the health of many young animals and fowl, and also of human beings could be improved by using only the natural food elements of these products without the accompanying fibers.

Various methods have been provided for producing concentrated food products from forage plants and it has been found that high temperatures used in cooking destroy part of the food value of the finished product. It has also been found that certain of the food values of vegetation are lost within a comparatively short time after the vegetation is harvested. For the product used in this invention it is preferred, therefore, to use concentrate that has not been subjected to elevated temperatures and that has been prepared immediately after the vegetation has been cut.

With this thought in mind this invention contemplates a substitute for coffee prepared from a syrup obtained from forage plants, such as alfalfa, wherein the plants are masticated as soon as they are cut and in which the juices are removed from the fibrous substances without destroying the food values contained therein.

The object of this invention is, therefore, to take a syrup prepared from juices obtained from vegetation without destroying the food values therein and reduce the syrup to a concentrate in the form of powder such as is adapted for use as a substitute for coffee.

Another object of this invention is to provide a method of dehydrating a syrup obtained from vegetation without destroying food values therein.

A further object of the invention is to provide an improved method of producing a coffee substitute from a syrup obtained from forage plants which is comparatively simple and economical.

One method of obtaining the juices from which the syrup is prepared is to run the cut vegetation through a hammer mill which breaks up the fibrous vegetation into extremely small parts.

After being broken up into finely divided parts by the hammer mill, which may be a mill of any suitable type, the vegetation is delivered to a pulper which provides a bearing and pressing action that tends to produce a dry pulpy product. However, as vegetation contains a relatively high percentage of moisture the product provides a fluid mass when ground into a pulp. Some of the moisture drains from the product by gravity and this moisture is conveyed to a storage tank in which it is subjected to as little light and air as possible. The remaining moisture is pressed from the product by rolls or other suitable means and the juices obtained thereby are also conveyed to the storage tank.

The fibrous materials from which the juices and food values contained therein have been removed may be used for any suitable purposes.

After the juice is extracted it is heated until it coagulates. The temperature of the liquid should not exceed one hundred eighty degrees Fahrenheit at any time as above this temperature certain of the vitamin content of the liquid appears to be lost.

When sufficient coagulation takes place, the juices or liquid in the storage tank are passed through a centrifuger with a six ounce duck canvas filter or is filtered through a filter form of six ounce duck canvas or its equivalent. This separates the protein from the carbohydrates.

The solid material collected on the filter is then dried in a tunnel belt dryer with a maximum heat of one hundred twenty degrees Fahrenheit. This relatively low drying temperature is used in order to maintain the highest possible content of vitamin A in the finished product.

The liquid which passes through the filter or centrifuger is evaporated in a vacuum evaporation system where it is boiled at a temperature of substantially one hundred ten degrees Fahrenheit. The pressure within the evaporation vessel is reduced until the liquid boils at approximately this temperature, or in any event below one hundred twenty degrees Fahrenheit. During this process the liquid is reduced to a syrup from which the final product of this invention is produced. This syrup may be used as a food ingredient.

The syrup obtained from this process is spread with a thin film over a smooth surface which may be flat, round or of any suitable shape and the film of syrup is dehydrated by heat. Should steam heated cylinders be used the syrup is spread finely in a thin film over the surfaces of the cylinders where it is dehydrated by aid of the heat. The heating step of the process is continued until the thinly spread syrup has dried and is thoroughly dehydrated.

When the thin film of syrup is thoroughly dehydrated the film is scraped from the cylinders or other surfaces by hand, or by mechanically operating instrumentalities, or by other means.

The product removed from the cylinders, rolls, or other surface is then thoroughly broken up by passing the mass through a suitable grinding and sifting machine until it is comminuted to the desired size, such as minute granulations. The grinding and sifting may be continued until the final product is of the size desired, and in the final step the product is passed through a comparatively fine mesh screen.

As an example, using alfalfa concentrate, the final product contains:

| | Per cent |
|---|---|
| Protein | 18.60 |
| Moisture | 6.92 |
| Fiber | 1.37 |
| Ash | 17.30 |
| Fat | 0.22 | and the vitamin B (riboflavin) content is 15.0 milligrams per pound.

From the foregoing description it is thought to be obvious that the final product produced in accordance with the process of this invention is particularly well adapted for use as a substitute for coffee by reason of the convenience and facility with which it may be produced, and it will also be obvious that this process is susceptible of some change and modification without departing from the principles and spirit thereof, and for this reason I do not wish to be understood as limiting myself to the precise process described herein in carrying out this invention in practice except as claimed.

Having thus fully described the invention what I claim as new and desire to secure by Letters Patent, is:

1. A method of extracting edible products from forage plants which comprises cutting the plants, immediately breaking the cut material into small parts, separating juices from fibres of the plants by pressing, heating the juices until the mass coagulates, separating the proteins from the carbohydrates by filtering the coagulated mass, evaporating the liquid passing through the filter, reducing the evaporated liquid to a syrup by boiling, dehydrating the syrup with heat, grinding and sifting the dehydrated material producing minute granulations, and screening the final product to produce a uniform mass.

2. A method of producing edible products from forage plants as described in claim 1, wherein the juices are heated at a temperature not to exceed 180° F. to obtain coagulation.

3. The method of obtaining edible products from forage plants as described in claim 1, wherein the residue from the filter is dried at a temperature not to exceed 120° F., the syrup is dehydrated by spreading a thin film over a heated roll, and the dehydrated product is removed from the roll by scraping.

4. A method of preparing a coffee substitute from alfalfa which comprises breaking freshly cut alfalfa into finely divided parts, reducing the finely divided parts of the alfalfa to a pulpy product, coagulating juices drained and pressed from said pulpy product by heat, separating proteins from carbohydrates of said pulpy product by filtering, evaporating liquid from the product that passes through the filter, dehydrating the product from which the liquid is evaporated by heating a thin film of the product, comminuting the dehydrated product to minute granulations, and screening the final product.

JAMES H. ZACHARY.

References Cited in the file of this patent

UNITED STATES PATENTS

| Number | Name | Date |
|---|---|---|
| 1,195,154 | Rich | Aug. 15, 1916 |
| 1,198,393 | Kellogg | Sept. 12, 1916 |
| 2,483,634 | Graham et al. | Oct. 4, 1949 |
| 2,600,903 | Miller | June 17, 1952 |